United States Patent Office 3,734,841
Patented May 22, 1973

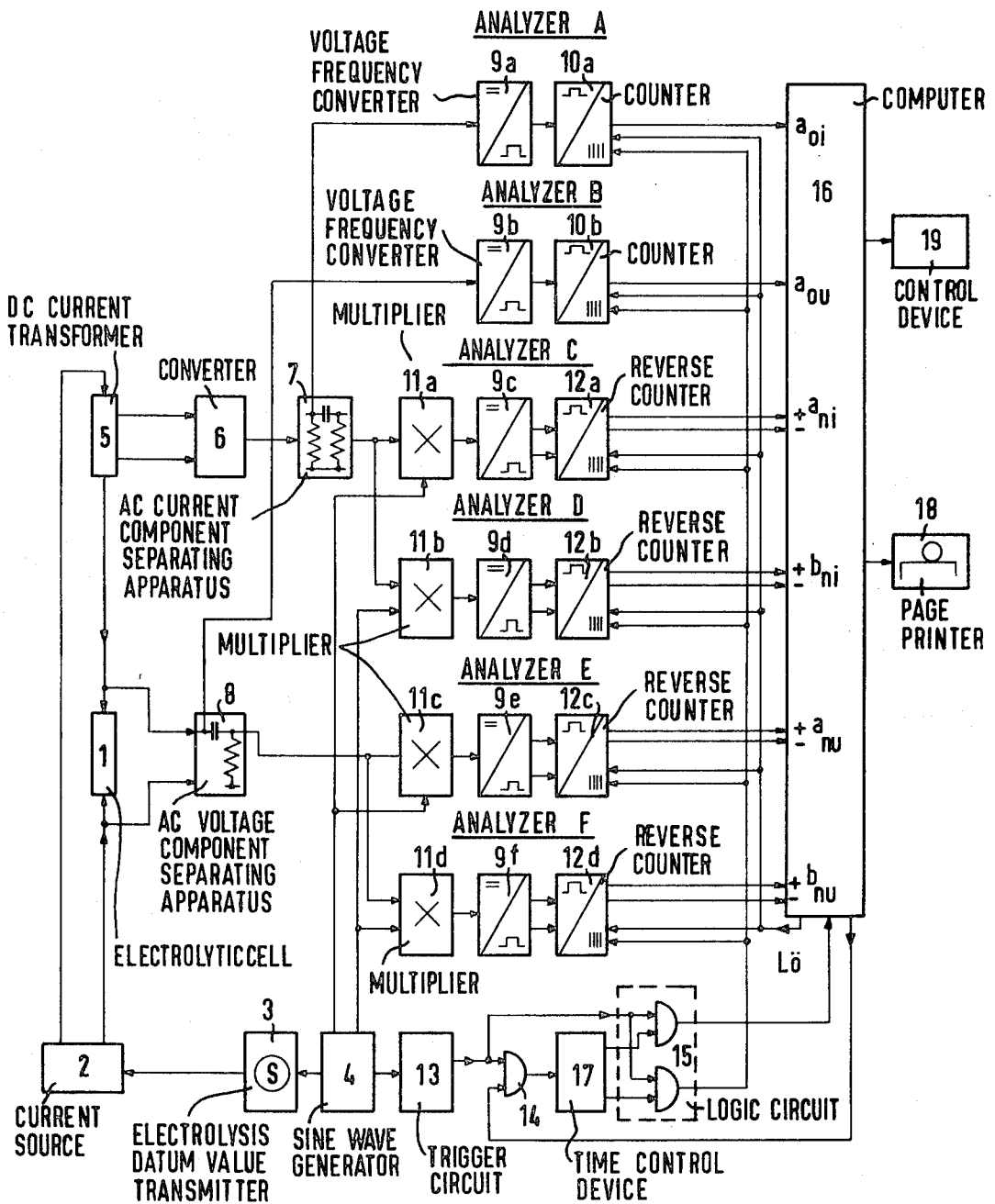

3,734,841
METHOD OF DETERMINING THE ACTUAL RESISTANCE VALUE OF AN ELECTROLYTIC CELL
Johann Thomas, Erlangen, Germany, assignor to Siemens Aktiengesellschaft, Berlin and Munich, Germany
Filed Oct. 12, 1971, Ser. No. 188,103
Claims priority, application Germany, Oct. 13, 1970, P 20 50 126.2
Int. Cl. B01k 3/00; C22d 3/12
U.S. Cl. 204—67
9 Claims

ABSTRACT OF THE DISCLOSURE

A method of determining the actual resistance value of an electrolytic cell for regulation to a constant cell resistance by measuring the cell voltage and the cell current comprises the steps of determining by Fourier analysis the median value of the Fourier coefficients of a harmonic wave in a specified period of time from the alternating components of the cell current and the cell voltage and computing the active and reactive components of the AC resistance from the Fourier coefficients. The method is undertaken by apparatus comprising Fourier analyzer means. The Fourier analyzer means comprises a plurality of multipliers equal in number to the number of Fourier coefficients to be determined. Each of a plurality of integrators is connected to the output of a corresponding one of the multipliers. An adjustable frequency sine wave generator has outputs connected to the inputs of the multipliers. Computer means has inputs connected to the outputs of the integrators for computing the effective resistance and the reactance from the Fourier coefficients.

---

The invention relates to a method of determining the actual resistance value of an electrolytic cell.

Electrolytic processes are intensive energy methods whose efficiency is poor compared to that of the rectifiers provided for their current supply. The low conductivity of the hydrous electrolyte, which may be provided as a melt, requires a small pole spacing or distance in order to save energy. This means a small distance between the cathode and the anode, which cannot be provided in sufficiently small dimensions, in dependence upon the type of electrolysis, due to possible short-circuits of cells, instability of the cell resistance, reduced current yield, and the operational temperatures which must be maintained. Considering these factors, an optimum pole distance and, thus, an optimum cell resistance is available which presupposes a minimum power or energy consumption. A direct measurement of the distance between the poles is not possible with the technical means available up to date. Hence, the distance between the poles is regulated so that the cell or furnace resistance remains constant.

To optimize aluminum electrolysis by means of a computer, it is necessary to measure the appropriate measured values of the electrolysis furnace parameters. The furnace resistance is a key parameter wherefrom other parameters can be determined. The following approximation equation for the cell resistance or furnace resistance applies for the current-voltage curve or characteristic of electrolysis, at a constant pole distance, when the deviation of the electrolytic current from the rated current is only slight.

$$R = \frac{U - U_0}{I}$$

wherein U is the direct voltage of the furnace, $U_0$ is the polarization voltage and I is the eletcrolytic direct current.

While the furnace voltage and the electrolytic current could be measured, it was not possible heretofore to continually measure the instantaneous value of the polarization voltage. Therefore, an average empirical value was fed into the computation in the form of the polarization voltage and in dependence upon several parameters of the electrolysis process. Since the ohmic resistance of an electrolysis furnace is subject to statistical deviation, we are interested in the median value of the resistance during a measuring time span, interval or period $\Delta t$. The time span $\Delta t$ must be sufficiently long compared to the longest period of a statistical deviation, so that the sum of the deviation can be zero, or small enough not to impair the required measuring accuracy.

Since changes in the pole distance are possible only within narrow limits, the current and the voltage must be measured exactly, to several pars promille. The polarization voltage, however, may vary by several percent during operation, so that the required measuring exactness needed to determine the resistance of the electrolysis furnace may virtually never be achieved.

It was previously suggested that the differential furnace resistance be measured or determined by measuring the electrolytic current and the furnace voltage, prior to and following a drop in the electrolytic current. This method, which may also be used to determine the polarization voltage, is applicable only when the current is reduced at least down to half the rated current and can, therefore, not be carried out continually during operation. During small voltage drops, for example, when the voltage is withdrawn at the rectifier by one selective switch step, the variation of the furnace resistance with time falsifies the measured result during the integration period required for forming the average value.

An abject of my invention is to provide a method of determining the actual resistance value of an electrolytic cell which eliminates the disadvantages of the known methods.

Another object of the invention is to provide a method of determining the effective resistance of the electrolysis furnace and the reactance of the electrolytic cell.

Still another object of the invention is to provide apparatus for determining the actual resistance value of an electrolytic cell with efficiency, effectiveness, reliability and accuracy.

In accordance with the invention, Fourier analysis is utilized to determine, from the alternating components of the cell current and the cell voltage, the average or median value of the Fourier coefficients of a harmonic wave within a prescribed period of time. The active and reactive components of the AC resistance are computed from the Fourier coefficients. The active component is the effective resistance and the reactive component is the reactance. The alternating components of the cell current and of the voltage which occur during operation may be analyzed individually, or together with additionally superimposed alternating components of the current and the voltage which are produced by an appropriate control of the power supply source or plant.

In accordance with the invention, a method of determining the actual resistance value of an electrolytic cell for regulation to a constant cell resistance by measuring the cell voltage and the cell current comprises the steps of determining by Fourier analysis the median value of the Fourier coefficients of a harmonic wave in a specified period of time from the alternating components of the cell current and the cell voltage and computing the active and reactive components of the AC resistance from the Fourier coefficients.

The power supply of the electrolytic cell is controlled and the alternating components of the cell current or the cell voltage occurring during operation are analyzed by themselves or with additionally superimposed alternating components of the current or voltage produced by controlling the power supply of the electrolytic cell.

The actual resistance of an aluminum electrolysis cell having spaced poles is determined. The quotients of the difference between the measured effective resistances and the difference between the measured reactances are computed, and the AC effective resistance and the AC reactance are determined at at least two arbitrary pole distances from the quotients.

The polarization voltage of the electrolytic cell is determined by deducting the product of the median value of the AC resistance and the direct cell current from the median value of the direct cell voltage thereby measuring the median values of the cell voltage, the cell current and the Fourier coefficients during the same interval of time.

The actual resistance of an aluminum electrolysis cell is determined. The thermal behavior of the aluminum electrolysis cell is determined by comparing the median values of the effective resistance and/or the reactance of a plurality of harmonic waves.

In accordance with the invention, apparatus for determining the actual resistance value of an electrolytic cell for regulation to a constant cell resistance comprises Fourier analyzer means for providing by Fourier analysis the median value of the Fourier coefficients of a harmonic wave in a specified period of time from the alternating components of the cell current and the cell voltage. The Fourier analyzer means comprises a plurality of multipliers equal in number to the number of Fourier coefficients to be determined and each having an input and an output. Each of a plurality of integrators has an input connected to the output of a corresponding one of the multipliers and an output. An adjustable frequency sine wave generator has outputs connected to the inputs of the multipliers. Computer means have inputs connected to the outputs of the integrators for computing the effective resistance and the reactance from the Fourier coefficients.

Each of the integrators of the Fourier analyzer comprises a voltage-frequency converter having an input connected to the corresponding one of the multipliers and an output and a counter having an input connected to the output of the voltage-frequency converter.

Time control means coupled between the sine wave generator and the computer means provides an integration time dependent upon the sine wave generator and the computer means.

Polarization voltage means for determining the polarization voltage of the electrolytic cell comprises a pair of additional integrators each for a different coefficient for determining the Fourier coefficients of the $n$th harmonic wave.

In accordance with another feature of the invention, the oxide concentration of an aluminum electrolytic cell of the AC effective resistance and the AC reactance are determined or measured by at least two arbitrarily adjusted pole distances and the quotients formed from the difference of the measured effective resistances and from the difference of the measured reactances.

In accordance with still another feature of the invention, in order to determine the polarization voltage of an electrolytic cell, the product of the median value of the AC effective resistance and the median value of the direct current of the cell is subtracted from the median value of the DC cell voltage. The median values of the cell voltage, of the cell current and of the Fourier coefficients are measured during the same time span, period or interval. In order to determine the thermal behavior of an aluminum electrolytic cell, the median values of the effective resistance and/or the reactance of several harmonic waves are compared with each other.

The method of the invention makes it possible to determine not only, as until now, the effective resistance of the electrolysis furnace, but also the reactance of the electrolytic cell. The reactance of the cell is produced by the inductivity of the conductive parts of the electrolysis furnace and by the subsequent replenishment effect of the electrolyte, which produce a capacitative component of the reactance. The reactance of the electrolysis furnace changes in proportion to small changes in the pole distance, for example, due to the raising and lowering of the anode during operation. The magnitude of one anode stroke, meaning a change in pole distance $\Delta L$, may be determined by the difference $\Delta X$ between the reactance prior to and following a variation in the pole distance. When $m$ is the proportionality factor, $\Delta L = m\Delta X$. The factor $m$ depends upon the construction of the furnace. The resistance variation or change $\Delta R$ of the electrolysis furnace per length unit $\Delta L$ of a small change in pole distance depends on several parameters $k_i$. This dependence is illustrated by the following equation:

$$\frac{\Delta R}{I} = a_{11}k_1 + a_{12}k_2 + \ldots + a_{1i}k_i$$

If $k_1$ is the oxide concentration in the electrolyte, the other parameters $a_{1i}k_i$ are kept constant equal to C in the sum, and $\Delta L = m\Delta X$ is given, the ratio of the change of the effective resistance and the change of the reactance due to a change in the pole distance determines the oxide concentration according to the following equation.

$$k_1 = \frac{1}{a_{11}} \left[ \frac{\Delta R}{m\Delta X} - C \right]$$

The replenishing effects of an aluminum electrolysis installation are influenced by the electrochemical processes at the cathode and at the anode. Since the electrochemical processes are usually subjected to slow changes or variations with respect to the intensity of their progress in the electrolysis furnace, these changes will not disturb the measuring of oxide concentration by polarization changes. Only just prior to the anode effect, that is, when the oxide concentration in the electrolyte drops below approximately 1%, a greater change of the capacitative component will occur with respect to time, and may be regarded as a sign of the approaching anode effect, making the measuring of the oxide concentration superfluous at such time.

To determine the AC resistance, in accordance with the invention, it is not necessary to know the magnitude of the polarization voltage $U_0$. On the contrary, it is even possible to determine the polarization voltage. This equation applies for a small range of polarization voltage.

$$U_0 = a_{21}k_1 + a_{22} + k_2 + \ldots a_{2i}k_i$$

The equation for $\Delta R/\Delta L$ permits the determination of two parameters, provided the other parameters do not change during the measuring time. The relative polarization voltage $U_0 = IR$ is derived from the equation $R = (U - U_0)/I$. Here, U is the median value of the D.C. furnace voltage and I is the median value of the electrolysis direct current during a time interval $\Delta t$, and hence equal to the coefficients $a_{ou}$ and $a_{oi}$ of the Fourier analysis of the time behavior of voltage and current, during the same time span, period or interval.

The resistance R is the effective resistance of the electrolytic cell, in this instance, of the electrolysis furnace at a frequency $f$. The effective resistance derived from the AC measurement differs from the effective AC resistance by an additional resistance $R_Z$, which results from current displacement. Hence, we have for the AC effective resistance:

$$R = R_0 + R_z$$

or $$R = R_0(1 + Af^2x^2\mu)$$

wherein $R_0$ is the DC resistance, A is a factor which takes into consideration the construction of the electrolysis furnace, $f$ is the frequency, $x$ is the conductivity and $\mu$ is the permeability of the conductive furnace parts.

At low frequencies such as, for example, one Hertz, the additional series resistance is so low that it falls within the measuring exactness, so that the AC effective resistance may be equated with the DC resistance. At very high frequencies, the influence of factors A and $x$ becomes very strong since these factors multiply the effect that the high frequencies have upon the additional series resistance.

Hence, the measurement of the additional series resistance at high frequencies may be used to determine the average conductivity at a constant factor A, which is the cross-section of the bath, or to determine the factor A at a constant conductivity. The thermal behavior of the furnace, that is, the effective cross-section of the bath, is determined by the conversion of energy in the furnace.

The additional series resistance is preferably determined by the percent of the DC resistance or effective resistance at low frequencies. If the effective resistance at high frequencies is $R_H$ and the effective resistance at low frequencies is $R_N$, then $$\frac{R_Z}{R_0} = \frac{R_H - R_N}{R_N}$$

In order that the invention may be readily carried into effect, it will now be described with reference to the accompanying drawing, wherein the single figure is a block diagram of an embodiment of apparatus of the invention for determining the actual resistance of an electrolytic cell in accordance with the method of the invention.

In the figure, an electrolytic cell 1 is connected to a current source 2 such as, for example, a rectifier device. The current source 2 is controlled by a voltage control apparatus or an electrolysis datum value transmitter 3, which is connected to a sine generator 4 with an adjustable frequency. The cell current is measured by a DC current transformer 5 comprising an additional converter or transducer device 6 and apparatus 7 connected to the output of the converter 6.

The apparatus 7 includes a load 7a. A voltage proportional to the direct current of the cell drops at the load 7a of the apparatus 7 and said apparatus delivers an output voltage which is proportional to the AC component of the cell current. A similar apparatus 8, which separates the AC component from the direct voltage of the cell, is directly connected to the leads which supply current to the cell 1.

In the example, an AC component is superimposed on the cell voltage and on the cell current by the voltage control of the rectifier installation. The measuring process may also utilize the AC components or harmonics which are present in any event in the rectifier operation, or else the static deviations may be utilized.

The output voltage of the separating device 7, which is proportional to the direct cell current, and the output voltage of the separating device 8, which is proportional to the aternating cell voltage, are delivered to an analyzer A and an analyzer B, respectively. Each of the analyzers A and B comprises a voltage-frequency converter $9a$ or $9b$ and a counter $10a$ or $10b$. The output voltage of the apparatus 7, which is proportional to the AC current component, and the output voltage of the apparatus 8, which is proportional to the AC voltage component, are delivered to two analyzers C and D and to two analyzers E and F, respectively. Each of the analyzers C, D, E and F comprises a multiplier $11a$, $11b$, $11c$ or $11d$, a voltage-frequency converter $9c$, $9d$, $9e$ or $9f$, and a reverse counter $12a$, $12b$, $12c$ or $12d$.

The sine wave generator 4 has an output connected to an input of the multiplier $11a$ of the analyzer C and to a corresponding input of the multiplier $11c$ of the analyzer E and applies an output voltage waveform $\hat{u} \sin \omega t$ to said multipliers. The sine wave generator 4 has another output connected to an input of the multiplier $11b$ of the analyzer D and to a corresponding input of the multiplier $11d$ of the analyzer F and applies an output voltage waveform $\hat{u} \cos \omega t$ to said multipliers. The sine wave generator 4 has another output connected to a trigger circuit 13, which supplies a pulse to one input of an AND gate 14 and one input of a logic circuit 15 during each zero passage of the voltage.

The count outputs of each of the counters $10a$ and $10b$ and each of the reverse counters $12a$, $12b$, $12c$ and $12d$, and the erasing inputs of said counters are connected to a computer 16. An output of the computer 16 is connected to the other input of the AND gate 14 and supplies a signal which releases the start of the integration, according to the Fourier principle. When the AND condition is fulfilled at the AND gate 14, a time control device 17 is energized and produces an undelayed signal at one output and a signal which is delayed by the integration time at its other output. Both outputs of the time control device are connected to the logic circuit 15.

The undelayed signal supplied from the time control device 17 to the logic circuit 15 causes said logic circuit to release the counters $10a$, $10b$, $12a$, $12b$, $12c$ and $12d$ after the arrival of a pulse produced by the trigger circuit 13. The undelayed signal disappears upon the expiration of the integration period, which is predetermined by the time control device 17, and the counters $10a$, $10b$, $12a$, $12b$, $12c$ and $12d$ are blocked or stopped.

The delayed signal, delivered by the time control device after the expiration of the integration period, is supplied to the computer 16 via the logic circuit 15 as soon as another pulse is produced by the trigger circuit 13 and indicates to said computer that the integration has been completed. As a result of this signal, the computer 16 scans or reads the counter positions and subsequently clears the counters $10a$, $10b$, $12a$, $12b$, $12c$ and $12d$. From the scanned or read out values, the computer then calculates the effective resistance R, the reactance X and, possibly, the polarization voltage $U_0$.

A page printer 18 is connected to the computer 16 and prints the computed values. The computer 16 adjusts, via a control device 19, the pole distance of the electrolytic cell to the datum value, based on the determined resistance values.

Each periodic and non-periodic oscillation process may be illustrated according to Fourier as a sum of pure sine and cosine oscillations. In the present instance, the cell voltage as a function of time is $$u(t) = a_{ou} + a_1 \cos \omega t + a_2 \cos 2\omega t + \ldots + a_n \cos n\omega t + b_1 \sin \omega t + b_2 \sin 2\omega t + \ldots + b_n \sin n\omega t$$

The cell current as a function of time is $$i(t) = a_{oi} + a_1 \cos \omega t + \ldots + a_n \cos n\omega t + b_1 \sin \omega t + \ldots + b_n \sin n\omega t$$

During non-periodic functions, the Fourier coefficients change or vary from period T to period. Of interest, therefore, are the median values of the Fourier coefficients over a specific time period $\tau = nT$, wherein T is the duration of the period of the sine function and the cosine function and $n$ is a whole number which indicates the fundamental wave or the $n$th harmonic wave.

The coefficients $a_{oi}$ and $a_{ou}$, which represent the median direct cell current and the median direct cell voltage, are determined in the analyzers A and B. The AC voltage coefficients $a_{nu}$ and $b_{nu}$ of frequency $f = n/\tau$ are determined in the voltage analyzers C, D, E and F from the voltage-frequency mixture. Since the multiplication result may be positive or negative in the multiplications of the analyzers C, D, E and F, the reverse counters are provided with a positive and a negative counter output, so that said multiplication result may be recognized whether the integrals are positive or negative. The computer 16 computes the median values from the determined coefficients over the integration period as $$c_{nu} = a^2_{nu} + b^2_{nu}$$

and $$c_{ni} = a^2_{ni} + b^2_{ni}$$

and the median impedance of the electrolytic cell is determined therefrom in accordance with the equation $$\mathcal{R} = k' \frac{c_{nu}}{c_{ni}}$$

The proportionality factor $k'$ takes into account the transformation ratio of the current transformer and the ratio of the multiplier constants.

For the phase angle of the current, $$\mathcal{F}_i = \arcsin \frac{a_{ni}}{c_{ni}}$$

and for the phase angle of the voltage $$\mathcal{F}_u = \arcsin \frac{a_{nu}}{c_{nu}}$$

The phase angle $\mathcal{F} = \mathcal{F}_i - \mathcal{F}_u$ between the alternating electrolysis current $i$ and the alternating furnace voltage $u$, may be used for computing the effective resistance and the reactance.

$$X = \mathcal{R} \sin \mathcal{F}$$

and $$R = \mathcal{R} \cos \mathcal{F}$$

From the coefficients $a_{oi}$ and $a_{ou}$ it is also possible to compute the polarization voltage of the electrolyte bath according to the equation $$U_0 = k_1 a_{ou} - k_2 a_{oi} R$$

The proportionality factors $k_1$ and $k_2$ are derived from the utilized measuring instruments and are stored in the computer.

The components of the apparatus of the invention, indicated by blocks, and appropriately labeled, may comprise any suitable circuit and/or devices for providing the indicated results. Thus, for example, suitable logic circuits, counters, reverse counters and computers are disclosed in a textbook by H. W. Gschwind entitled "Design of Digital Computers," Springer-Verlag, 1967, Vienna and New York. Logic circuits are described on pages 45 to 52 of the aforedescribed textbook, counters and reverse counters are described on pages 115 to 123 of said textbook, and computers are described on pages 160 to 347 of said textbook.

Sine wave generators, voltage frequency converters and multipliers are disclosed in a manual published by FGS Fairchild Company entitled "The Application of Linear Microcircuits," August 1967. Sine wave generators are described on page 93 of the aforedescribed manual, voltage frequency converters are described on pages 96 to 98 of said manual, and multipliers are described on pages 111 and 112 of said manual.

Catalog BA 11 of December 1970, entitled "SIMATIC N Static Switching System" of Siemens Aktiengesellschaft, English edition, discloses time control components such as monostable multivibrators, logic circuits, timer circuits and counters on pages 12, 14, 16 and 34 to 39, and voltage frequency converters on page 205.

The datum value transmitter 3 may comprise a conventional potentiometer, for example. The converter 6 may comprise current supply apparatus including transformers and rectifiers. The AC current component separating apparatus 7 and the AC voltage component separating apparatus 8 include, as shown in the figure, one or two resistors and a capacitor and are utilized to separate the DC component from the AC component of the voltage provided by the electrolytic cell 1 or of the current picked up by the converter. The page printer 18 may comprise a conventional teletype machine. The control device 19 includes, in a known manner, relays and projections for operating a motor which adjusts the spacing of the electrodes. The page printer 18 and the control device 19 are beyond the scope of the invention, so that detailed disclosures thereof are not submitted herewith.

While the invention has been described by means of specific examples and in specific embodiment, I do not wish to be limited thereto, for obvious modifications will occur to those skilled in the art without departing from the spirit and scope of the invention.

I claim:

1. A method of determining the actual resistance value of an electrolytic cell for regulation to a constant cell resistance by measuring the cell voltage and the cell current, said method comprising the steps of determining by Fourier analysis the median value of the Fourier coefficients of a harmonic wave in a specified period of time from the alternating components of the cell current and the cell voltage; and computing the active and reactive components of the AC resistance from the Fourier coefficients.

2. A method as claimed in claim 1, further comprising controlling the power supply of the electrolytic cell, and analyzing the alternating components of the cell current or the cell voltage occurring during operation by themselves or with additionally superimposed alternating components of the current or voltage produced by controlling the power supply of the electrolytic cell.

3. A method as claimed in claim 1, for determining the actual resistance of an aluminum electrolysis cell having spaced poles, further comprising computing the quotients of the difference between the measured effective resistances and the difference between the measured reactances, and determining the AC effective resistance and the AC reactance at at least two arbitrary pole distances from the quotients.

4. A method as claimed in claim 1, further comprising determining the polyarization voltage of the electrolytic cell by deducting the product of the median value of the AC resistance and the direct cell current from the median value of the direct cell voltage thereby measuring the median values of the cell voltage, the cell current and the Fourier coefficients during the same interval of time.

5. A method as claimed in claim 1, for determining the actual resistance of an aluminum electrolysis cell, further comprising determining the thermal behavior of the aluminum electrolysis cell by comparing the median values of the effective resistance and/or the reactance of a plurality of harmonic waves.

6. Apparatus for determining the actual resistance value of an electrolytic cell for regulation to a constant cell resistance, said apparatus comprising Fourier analyzer means for providing by Fourier analysis the median value of the Fourier coefficients of a harmonic wave in a specified period of time from the alternating components of the cell current and the cell voltage, said Fourier analyzer means comprising a plurality of multipliers equal in number to the number of Fourier coefficients to be determined and each having an input and an output, a plurality of integrators each having an input connected to the output of a corresponding one of the multipliers and an output and an adjustable frequency sine wave generator having outputs connected to the inputs of the multipliers, and computer means having inputs connected to the outputs of the integrators for computing the effective resistance and the reactance from the Fourier coefficients.

7. Apparatus as claimed in claim 6, wherein each of the integrators of the Fourier analyzer comprises a voltage-frequency converter having an input connected to the corresponding one of the multipliers and an output and a counter having an input connected to the output of the voltage-frequency converter.

8. Apparatus as claimed in claim 6, further comprising time control means coupled between the sine wave generator and the computer means for providing an integration time dependent upon the sine wave generator and the computer means.

9. Apparatus as claimed in claim 6, further comprising polarization voltage means for determining the polarization voltage of the electrolytic cell, said polarization voltage means comprising a pair of additional integrators each for a different coefficient for determining the Fourier coefficients of the $n$th harmonic wave.

References Cited
UNITED STATES PATENTS

| | | | |
|---|---|---|---|
| 3,583,896 | 6/1971 | Piller | 204—67 |
| 3,625,842 | 12/1971 | Bristol | 204—67 |
| 3,629,079 | 12/1971 | Bristol | 204—67 |
| 3,632,488 | 1/1972 | Decker et al. | 204—67 |

JOHN H. MACK, Primary Examiner

D. R. VALENTINE, Assistant Examiner

U.S. Cl. X.R.

204—228